(12) United States Patent
Davis

(10) Patent No.: US 12,440,903 B2
(45) Date of Patent: *Oct. 14, 2025

(54) TOOL ADAPTER

(71) Applicant: Davis Tool Systems Inc., Houston, TX (US)

(72) Inventor: Eric Alain Davis, Haramont (FR)

(73) Assignee: Davis Tool Systems Inc., Houston, TX (US)

( * ) Notice: Subject to any disclaimer, the term of this patent is extended or adjusted under 35 U.S.C. 154(b) by 479 days.

This patent is subject to a terminal disclaimer.

(21) Appl. No.: 17/752,725

(22) Filed: May 24, 2022

(65) Prior Publication Data
US 2022/0281014 A1    Sep. 8, 2022

Related U.S. Application Data

(63) Continuation-in-part of application No. 16/939,755, filed on Jul. 27, 2020, now Pat. No. 11,376,669.

(60) Provisional application No. 62/879,449, filed on Jul. 27, 2019.

(51) Int. Cl.
*B23B 31/107*    (2006.01)
*B23B 31/11*    (2006.01)

(52) U.S. Cl.
CPC .......... *B23B 31/1071* (2013.01); *B23B 31/11* (2013.01); *B23B 2231/04* (2013.01)

(58) Field of Classification Search
CPC ................. B23B 31/1071; B23B 31/11; B23B 2231/0204; B23B 2231/04
See application file for complete search history.

(56) References Cited

U.S. PATENT DOCUMENTS

| | | | | |
|---|---|---|---|---|
| 1,119,276 | A * | 12/1914 | Griffith et al. | B23B 31/1071 279/75 |
| 2,481,945 | A * | 9/1949 | Panyard | B23B 31/1071 279/82 |
| 3,735,993 | A * | 5/1973 | Seibert | B23B 31/1071 279/75 |
| 4,273,344 | A * | 6/1981 | Benson | B23B 31/1071 408/226 |
| 4,577,875 | A * | 3/1986 | Miyakawa | B23B 31/1071 279/155 |

(Continued)

FOREIGN PATENT DOCUMENTS

| | | | | |
|---|---|---|---|---|
| CH | | 371939 A * | 9/1963 | |
| DE | 102006061109 A1 * | | 6/2008 | ............. B23B 31/11 |

*Primary Examiner* — Eric A. Gates
(74) *Attorney, Agent, or Firm* — KALI LAW GROUP, P.C.

(57) ABSTRACT

Tool adapter assemblies are presented including: a quick release coupler including: a spindle defining a partial cylindrical cavity, the spindle including a base portion, a body portion, and an end portion where the body portion includes a number of ball stop recesses; a number of ball stops slidingly engaged with the number of ball stop recesses; and a sleeve slidingly coupled with the spindle, where the sleeve is configured to lock and release the ball stops; and an accessory connector including at least one of: one or more annular grooves configured to engage with number of ball stops, a number of detents configured to engage with number of ball stops; and an accessory engagement portion positioned along a proximal end of the accessory connector.

11 Claims, 9 Drawing Sheets

(56) References Cited

U.S. PATENT DOCUMENTS

| | | | | |
|---|---|---|---|---|
| 7,219,753 B2* | 5/2007 | Gaul | .................... | B23B 51/0473 |
| | | | | 408/239 R |
| 7,387,479 B1* | 6/2008 | Lee | ..................... | B23B 31/1071 |
| | | | | 279/82 |
| 7,810,817 B1* | 10/2010 | Gao | ..................... | A61B 17/162 |
| | | | | 279/75 |
| 11,376,669 B2* | 7/2022 | Davis | ....................... | B23B 51/12 |
| 2013/0127123 A1* | 5/2013 | Miyanaga | ............. | B23B 31/008 |
| | | | | 408/226 |

* cited by examiner

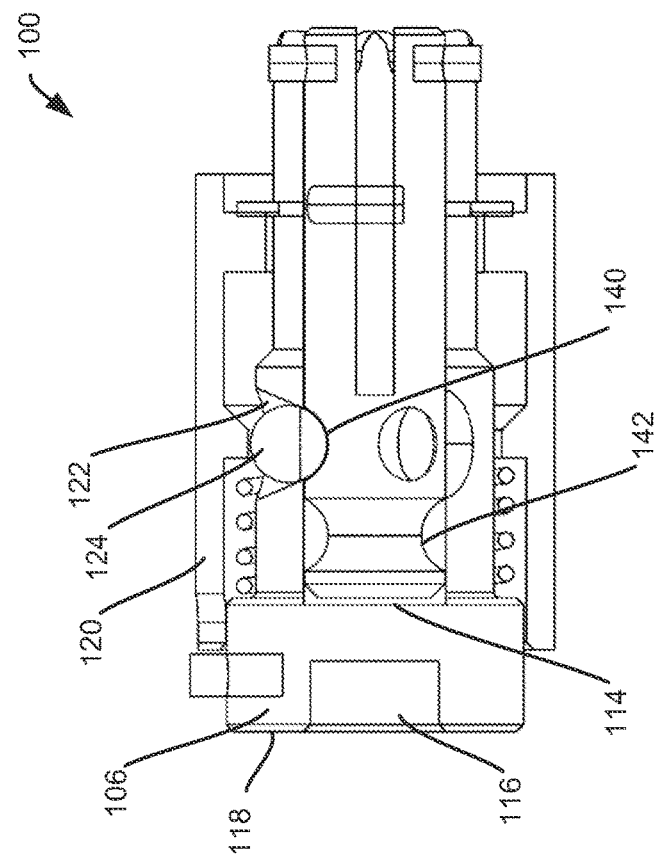
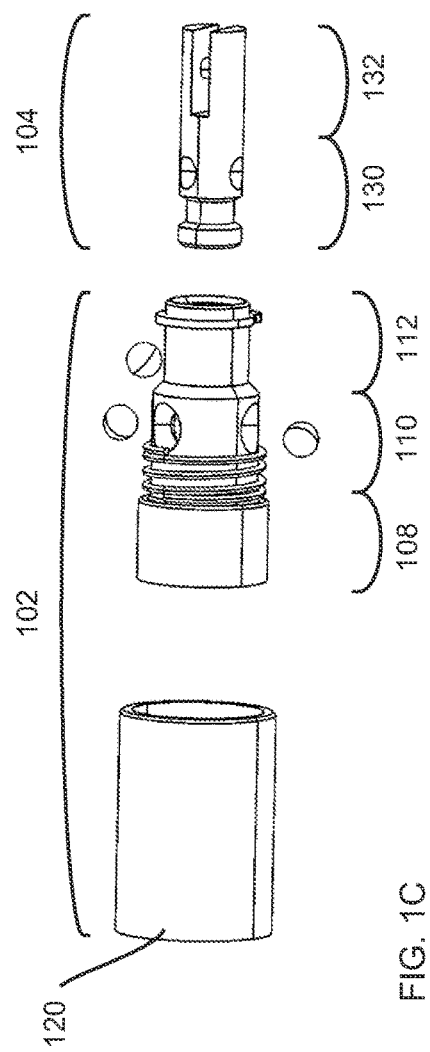
FIG. 1A
FIG. 1C
FIG. 1B

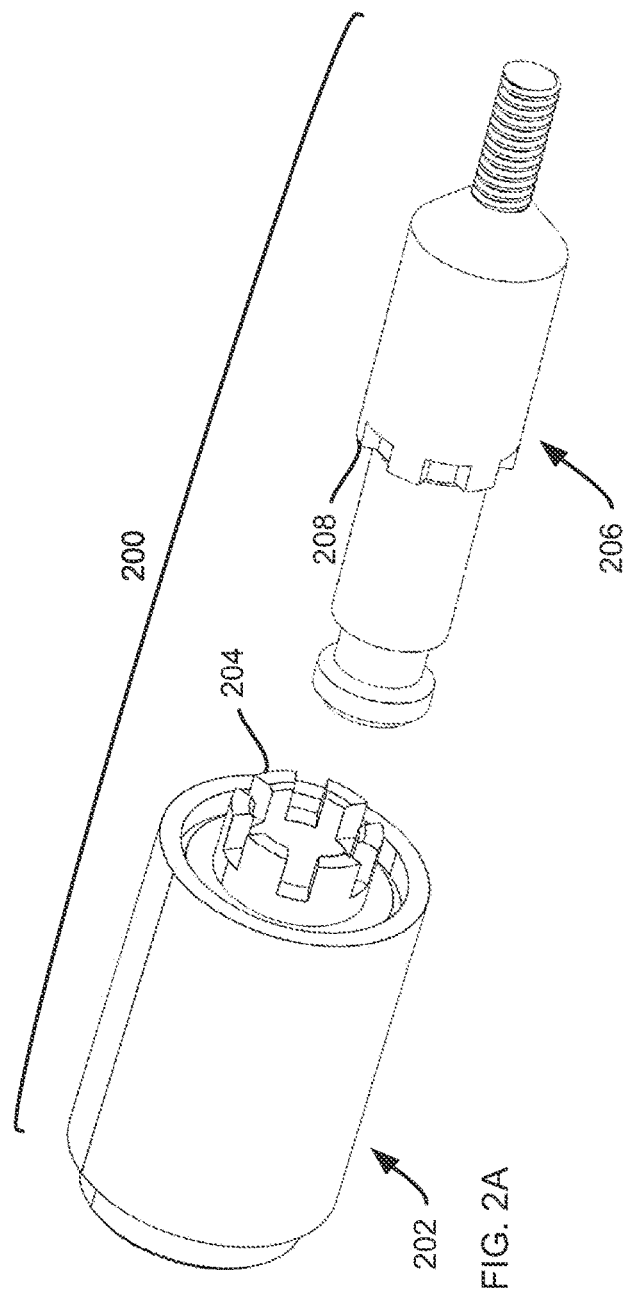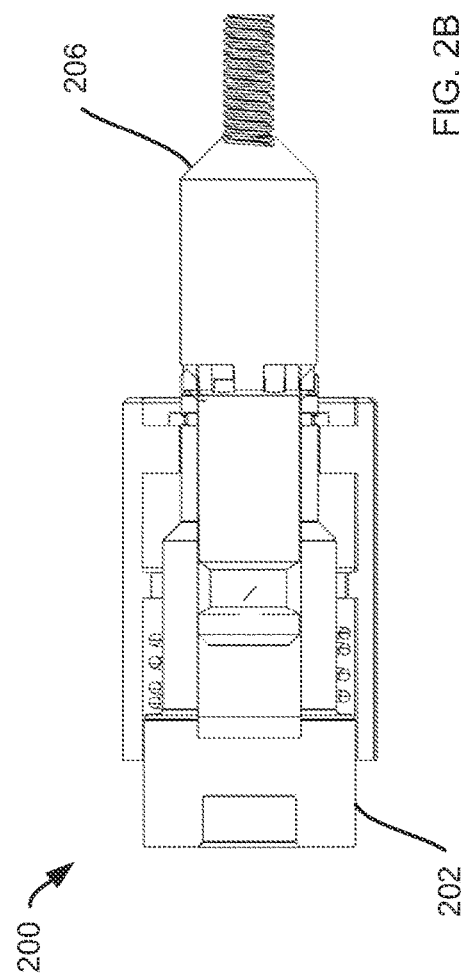

TOOL ADAPTER

FIELD OF INVENTION

The present invention relates to tool adapters for both manual and powered tools. Specifically, the present invention relates to the coupling of accessory shanks or bits to a quick release adapter that provides free rotation or fixed position mounting of accessories in a variety of ways.

BACKGROUND

The present invention relates to quick release reciprocal and rotational action tools are well-known in the art. Initially, reciprocal action tools employed a blade attached at one end to the reciprocating shaft of the tool. One advantage of the reciprocal action tool was that the blade could be plunged into work due to the single attachment point. In time, other tooling attachments were adapted for use with reciprocal action tools. For example, scrapers, files, and brushes were fitted with a blade tang suitable for coupling with the tool. These tooling attachments provided additional functionality to an already useful tool. While these types of tools and accompanying tooling attachments have provided many advantages, there exist attendant disadvantages.

For example, when using a scraper with a reciprocating saw, the scraper remains in a constant plane with respect to the tooling of the reciprocating saw so that the user must adjust his or her ergonomic stance in order to use it effectively. U.S. patent application Ser. No. 12/493,678 discloses a hex key design adapter for a reciprocating saw where the user is obliged to pull the hex key shank completely out of the reciprocating shaft in order to change the plane of the tool being used in relation to the power tool. This design creates an elongated external connection that introduces more vibrations. The hex key shank and reciprocating shaft design prevent rotations. In addition, only one accessory can be manipulated at one time since the hex key shank is welded or permanently affixed to the accessory. In other examples, attaching accessories smaller than the width of the shank is sometimes desirable such as when passing the accessory or tool first through a narrow latte in a chair. In this example, the shank prevents the accessory from passing if it is permanently affixed to the shank. Generally, in reciprocating tools, the amount of surface contact is limited to the size and gauge of the blade tang that supports it. In rotational tools like a drill, the size and form of the shank and the adapters capture mechanisms internally have a limited amount of torque before the accessory rotates.

Thus, while the utility of the quick release adapters and shanks are clear, their effectiveness is limited. Similar problems are apparent with a variety of other tooling attachments. As such tool adapters are presented herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, tool adapter assemblies are presented including: a quick release coupler including: a spindle defining a partial cylindrical cavity, the spindle including a base portion, the base portion defining a first cylindrical surface having a first diameter, where the base portion continues to a body portion, the body portion defining a second cylindrical surface having a second diameter, where the body portion continues to an end portion, the end portion defining a third cylindrical surface having a third diameter, where the base portion is configured to mechanically couple with a tool along a distal end of the base portion, and where the body portion includes a number of ball stop recesses equidistantly positioned along the second cylindrical surface and extending to the partial cylindrical cavity; a number of ball stops slidingly engaged with the number of ball stop recesses; and a sleeve slidingly coupled with the spindle, where the sleeve is configured to lock and release the number of ball stops; and an accessory connector defining a fourth cylindrical surface, the accessory connector including: a coupler engagement portion positioned along a distal end of the accessory connector, the coupler engagement portion comprising one of: an annular groove positioned along the fourth cylindrical surface, where the annular groove is configured to engage with the ball stops, a number of detents positioned equidistantly along a circumference of the fourth cylindrical surface, where the detents are proximately located with a single annular groove, where the detents and the single annular groove are configured to separately engage with the number of ball stops, or a number of detents positioned equidistantly along a circumference of the fourth cylindrical surface, where the detents are configured to engage with the ball stops; and an accessory engagement portion positioned along a proximal end of the accessory connector. In some embodiments, the base portion further includes: an accessory connector stop positioned along the base portion that limits engagement of the accessory connector at the distal end of the accessory connector; and a tool receiving hub including: a spindle face positioned along the distal end of the base portion; and a receiving bore extending from the spindle face along an axis of the base portion, where the spindle face and the receiving bore are each configurable to mechanically couple with the tool. In some embodiments, the accessory engagement portion includes: a threaded end, a slotted end, a slotted and single pinned end, and a slotted and double pinned end. In some embodiments, the tool is includes: a powered reciprocating tool, a powered oscillating tool, a powered rotating tool, a manual reciprocating tool, a manual oscillating tool, and a manual rotating tool. In some embodiments, the spindle further includes crenelated end portion, and where the accessory connector includes a crenelated ring positioned between the coupler engagement portion and the accessory engagement portion to engage the crenelated end portion. In some embodiments, the coupler engagement portion engages the number of ball stops in a first position and a second position corresponding with the one or more annular grooves, the number of detents, or both the annular groove and the number of detents.

In other embodiments, tool systems are presented including: a tool, where the tool includes: a powered reciprocating tool, a powered oscillating tool, a powered rotating tool, a manual reciprocating tool, a manual oscillating tool, and a manual rotating tool; a tool adapter assembly mechanically coupled with the tool, the tool adapter assembly including: a quick release coupler including: a spindle defining a partial cylindrical cavity, the spindle including a base portion, the base portion defining a first cylindrical surface having a first diameter, where the base portion continues to a body portion, the body portion defining a second cylindrical surface having a second diameter, where the body portion continues to an end portion, the end portion defining a third cylindrical surface having a third diameter, where the base portion is configured to mechanically couple with the tool along a distal end of the base portion, and where the body portion includes a number of ball stop recesses equidistantly positioned along the second cylindrical surface and extending to the partial cylindrical cavity; a number of ball stops slidingly engaged with the number of ball stop recesses; and a sleeve slidingly coupled with the spindle, where the sleeve is configured to lock and release the number of ball stops; and an accessory connector defining a fourth cylindrical surface, the accessory connector including: a coupler engagement portion positioned along a distal end of the accessory connector, the coupler engagement portion including: at least one of: one or more annular grooves positioned along the fourth cylindrical surface and configured to engage with number of ball stops, a number of detents positioned equidistantly along the fourth cylindrical surface and configured to engage with number of ball stops, or both the annular groove and the number of detents; and an accessory engagement portion positioned along a proximal end of the accessory connector.

In other embodiments, methods of using a tool system are presented including: providing a tool, where the tool is selected from the group consisting of: a powered reciprocating tool, a powered oscillating tool, a powered rotating tool, a manual reciprocating tool, a manual oscillating tool, and a manual rotating tool; providing a tool adapter assembly including: a quick release coupler including: a spindle defining a partial cylindrical cavity, the spindle including a base portion, the base portion defining a first cylindrical surface having a first diameter, where the base portion continues to a body portion, the body portion defining a second cylindrical surface having a second diameter, where the body portion continues to an end portion, the end portion defining a third cylindrical surface having a third diameter, where the base portion is configured to mechanically couple with the tool along a distal end of the base portion, and where the body portion includes a number of ball stop recesses equidistantly positioned along the second cylindrical surface and extending to the partial cylindrical cavity; a number of ball stops slidingly engaged with the number of ball stop recesses; and a sleeve slidingly coupled with the spindle, where the sleeve is configured to lock and release the number of ball stops; and an accessory connector defining a fourth cylindrical surface, the accessory connector including: a coupler engagement portion positioned along a distal end of the accessory connector, the coupler engagement portion including: at least one of: one or more annular grooves positioned along the fourth cylindrical surface and configured to engage with number of ball stops, a number of detents positioned equidistantly along the fourth cylindrical surface and configured to engage with number of ball stops, or both the annular groove and the number of detents; and an accessory engagement portion positioned along a proximal end of the accessory connector; providing an accessory; coupling the tool with the tool adapter assembly; coupling the accessory with the accessory connector along the accessory engagement portion; and engaging the accessory connector with the quick release coupler along a first position corresponding with the one or more annular grooves, the number of detents, or both the annular groove and the number of detents.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 1A-1C are illustrative representations of a tool adapter assembly in accordance with embodiments of the present invention;

FIGS. 2A-B are illustrative representations of a tool adapter assembly with crenellation in accordance with embodiments of the present invention;

DETAILED DESCRIPTION

Figure 3:
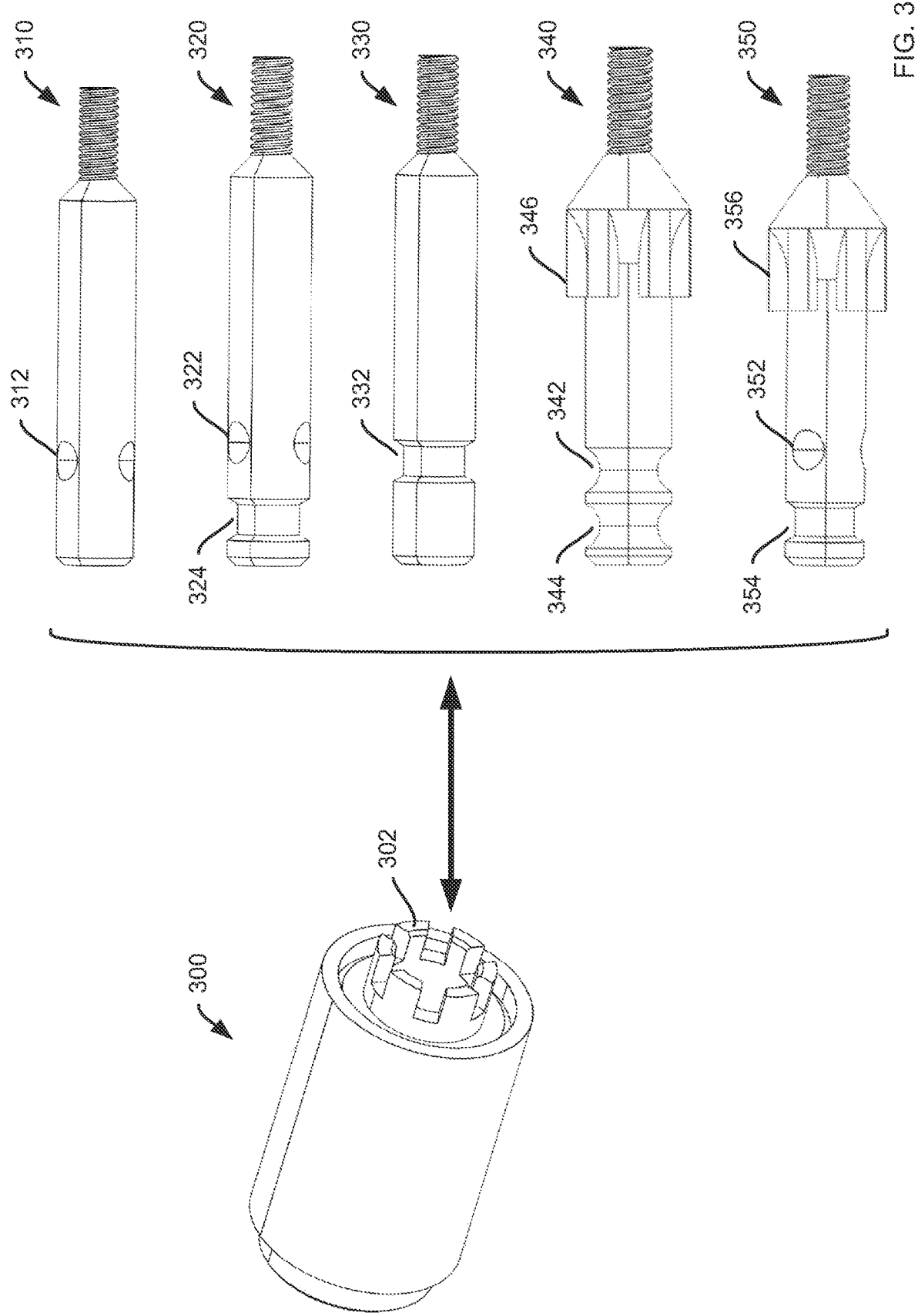
FIG. 3 is an illustrative representation of a tool adapter assembly with various accessory connectors in accordance with embodiments of the present invention.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In still other instances, specific numeric references such as "first material," may be made. However, the specific numeric reference should not be interpreted as a literal sequential order but rather interpreted that the "first material" is different than a "second material." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

FIGS. 1A-1C are illustrative representations of a tool adapter assembly in accordance with embodiments of the present invention. In particular, FIG. 1A is an orthogonal view of tool adapter assembly 100, FIG. 1B is a cross-sectional view of tool adapter assembly 100, and FIG. 1C is an exploded view of tool adapter assembly 100. The following discussion will reference FIGS. 1A-1C collectively. As illustrated, tool adapter assembly 100 includes quick release coupler 102 and accessory connector 104 that function cooperatively to couple a tool whether powered or manual with an accessory. As contemplated herein, a variety of powered and manual tools may be utilized without limitation in embodiments. For example, powered tool embodiments include: powered reciprocating tools, powered oscillating tools, and powered rotating tools in any combination without limitation. In other examples, manual tool embodiments include: manual reciprocating tools, manual oscillating tools, and manual rotating tools in any combination without limitation. Tool adapter assembly embodiments disclosed herein provide: a secure connection between the tool and accessory; a robust connection between the tool and accessory; and, in some embodiments, a rotating or fixed position connection between the tool and accessory.

As illustrated, quick release coupler 102 includes spindle 106 having base portion 108, body portion 110, and end portion 112. Base portion 108 defines a cylindrical surface having a diameter suitable for slidingly engaging sleeve 120. In embodiments, the base portion diameter is in a range of approximately 20.0 to 22.0 mm. In smaller sized embodiments, the base portion diameter is in a range of approximately 14.0 to 16.0 mm. Base portion 108 includes an accessory connector stop 114 positioned along the base portion to limit engagement of the accessory connector 104 at its distal end. Base portion 108 further includes a tool receiving hub that includes: spindle face 118 positioned along the distal end of the body portion; and receiving bore 116 that extends from the spindle face along an axis of the base portion. In embodiments, the spindle face and the receiving bore are each configurable to mechanically couple with a tool of choice. Further illustrated, body portion 110 defines a cylindrical surface having a diameter in a range of approximately 17.0 to 19.0 mm. In smaller sized embodiments, the body portion diameter is in a range of approximately 9.0 to 11.0 mm. Body portion 110 includes a number of ball stop recesses 122 equidistantly positioned along the cylindrical surface and extending to the partial cylindrical cavity of the spindle. In some embodiments, body portion includes at least two ball stop recesses. In other embodiments, the body portion includes at least three ball stop recesses. Further illustrated, end portion 112 defines a cylindrical surface having a diameter in a range of approximately 13.0 to 15.0 mm. In smaller sized embodiments, the body portion diameter is in a range of approximately 4.0 to 6.0 mm. Further illustrated, quick release coupler 102 further includes ball stops 124 that slidingly engage with ball stop recesses 122 where the number of ball stops correspond with the number of ball stop recesses. It may be appreciated that the ball stops are under stress or load while in use and that the preferred ball bearing size is 5.0 mm diameter but is not limited to this size. When the bearings are trapped in the detents or annular groove, in some embodiments it may be desirable to have larger diameter ball bearings to increase the shear strength of the ball bearing. Further illustrated, quick release coupler 102 includes sleeve 120 slidingly coupled with spindle 106, where the sleeve is configured to lock and release the ball stops. Locking sleeves will be discussed in further detail below for FIG. 9.

As illustrated, accessory connector 104 defines a cylindrical surface and includes coupler engagement portion 130 and accessory engagement portion 130. As shown, coupler engagement portion 130 is positioned along a distal end of the accessory connector 104 and includes: one or more annular grooves positioned along the cylindrical surface and configured to engage with the ball stops, a number of detents positioned equidistantly along the cylindrical surface and configured to engage with plurality of ball stops, or both an annular groove and a number of detents. In embodiments, coupler engagement portion engages the plurality of ball stops in one of two positions (140 and 142) corresponding with either of the annular grooves, or with the detents. Coupler engagement portion embodiments will be discussed in further detail below for FIG. 3 below. As shown, accessory engagement portion 130 positioned along a proximal end of accessory connector 104. A number of accessory engagement portion embodiments are configurable with tool adapter embodiments. Accessory engagement portion embodiments will be discussed in further detail below for FIGS. 3-7 below.

FIGS. 2A-2B are illustrative representations of a tool adapter assembly with crenellation in accordance with embodiments of the present invention. In particular, FIG. 2A is an illustrative exploded view representation of a tool adapter assembly 200 with crenellation in accordance with embodiments of the present invention and FIG. 2B is an illustrative cross-sectional view representation of a tool adapter assembly 200 with crenellation in accordance with embodiments of the present invention. The following discussion will reference FIGS. 2A-2B collectively. As illustrated, tool adapter assembly 200 includes quick release coupler 202 and accessory connector 206 that function cooperatively to couple a tool whether powered or manual with an accessory. As contemplated herein, a variety of powered and manual tools may be utilized without limitation in embodiments. For example, powered tool embodiments include: powered reciprocating tools, powered oscillating tools, and powered rotating tools in any combination without limitation. In other examples, manual tool embodiments include: manual reciprocating tools, manual oscillating tools, and manual rotating tools in any combination without limitation. Tool adapter assembly embodiments disclosed herein provide: a secure connection between the tool and accessory; a robust connection between the tool and accessory; and, in some embodiments, a rotating or fixed position connection between the tool and accessory. The fixed position can be fixed at one or more positions to increase usefulness or rigidity and can have different geometrical configurations to ensure optimal connections. Because tool adapter embodiments can be used for both rotational, reciprocal, and oscillation motion, the accessories or devices coupled may be trapped within the bore (or partial cavity) of the spindle allowing the user to determine the optimal configuration of the accessories or tools or ergonomic position of the user.

As noted above, in embodiments, coupler engagement portion engages the plurality of ball stops in one of two positions (140 and 142; see FIG. 1) corresponding with either of the annular grooves, or with the detents. The positions correspond with the depth of engagement with the accessory connector. In the partially engaged position, the accessory connector is coupled with the quick release coupler corresponding with an outward annular groove or detent. In the fully engaged position, the accessory connector is coupled with the quick release coupler corresponding with an inward annular groove or detent (see FIG. 1). Returning to FIGS. 2A-2B, end portion 204 of the spindle is crenelated and accessory connector 206 includes crenelated ring 208 positioned between the coupler engagement portion and the accessory engagement portion to engage the crenelated end portion. Importantly, the crenellation is engaged only in the fully engaged position of the accessory connector with the quick release connector as illustrated. In the partially engaged position, the crenellation is not engaged. Thus, in the fully engaged position, the accessory connector is additionally secured by the crenellation.

FIG. 3 is an illustrative representation of a tool adapter assembly with various accessory connectors in accordance with embodiments of the present invention. As illustrated, quick release coupler 300 includes crenellated end portion 302. As contemplated herein, various accessories connectors may be utilized with a quick release coupler embodiment having either a crenellated end portion as shown or without a crenellated end portion as disclosed in FIGS. 1 and 2. Further noted the various accessory connectors are shown having a threaded accessory engagement portion. However, other accessory engagement portions may be utilized in embodiments without limitation and will be disclosed in further detail below. As illustrated, accessory connector 310 includes a number of inward detents 312 positioned equidistantly along the cylindrical surface and configured to engage with plurality of ball stops housed in the quick release coupler 300. In some embodiments, up to six detents may be utilized. When engaged, the inward detents serve to secure the accessory connector into a particular rotational position, which may be desirable when using, for example, a flat chisel accessory. As illustrated, accessory connector 310 is coupled with the quick release coupler 300 along the inward detent 312 in the fully engaged position in accordance with a user's selection. Further illustrated, accessory connector 320 includes a number of inward detents 322 positioned equidistantly along the cylindrical surface and an outward annular groove 324 positioned along the cylindrical surface each configured to engage with plurality of ball stops housed in the quick release coupler 300. When engaged, the outward annular groove serves to secure the accessory connector into a freely rotating position, which may be desirable when using, for example, a sanding accessory. Additionally, when engaged, the detents serve to secure the accessory connector into a desired fixed position, which may be desirable when using, for example, a flat chisel accessory. As illustrated, accessory connector 320 will couple with the quick release coupler 300 along the outward annular groove 324 in the partially engaged position or with the inward detents 322 in the fully engaged position in accordance with a user's selection.

Further illustrated, accessory connector 330 includes inward annular groove 332 positioned along the cylindrical surface and configured to engage with plurality of ball stops housed in the quick release coupler 300. When engaged, the inward annular groove serves to secure the accessory connector into a freely rotating position, which may be desirable when using, for example, a sanding accessory. As illustrated, accessory connector 330 will coupled with the quick release coupler 300 along the inward annular groove 332 in the fully engaged position in accordance with a user's selection. When engaged in the fully engaged position, accessory connectors contact the accessory connector stop (see 114; FIG. 1B). Contact with the accessory stop connector in embodiments limits engagement of the accessory connector and mitigates shearing stresses on ball stops.

Further illustrated, accessory connector 340 includes inward annular groove 342 positioned along the cylindrical surface and outward annular groove 344 positioned along the cylindrical surface each configured to engage with plurality of ball stops housed in the quick release coupler 300. As illustrated, accessory connector 340 will couple with the quick release coupler 300 along outward annular groove 344 in the partially engaged position or with inward annular groove 342 in the fully engaged position in accordance with a user's selection. Importantly, when in the fully engaged position, crenellation ring 346 couples with crenelated end 302 to secure the accessory in a particular rotational position. As such, the combination of the annular groove and the crenellation functions much like inward detents disclosed above with respect to fixing the rotational position of the accessory connector and adds additional structural support to embodiments disclosed herein. Additionally, when engaged, the outward annular groove serves to secure the accessory connector into a freely rotating position, which may be desirable when using, for example, a sanding accessory. Further illustrated, accessory connector 350 includes a number of inward detents 352 positioned equidistantly along the cylindrical surface and an outward annular groove 354 positioned along the cylindrical surface each configured to engage with plurality of ball stops housed in the quick release coupler 300. When engaged, the outward annular groove serves to secure the accessory connector into a freely rotating position, which may be desirable when using, for example, a sanding accessory. Additionally, when engaged, the detents serve to secure the accessory connector into a particular rotational position, which may be desirable when using, for example, a flat chisel accessory. As illustrated, accessory connector 320 will couple with the quick release coupler 300 along the outward annular groove 324 in the partially engaged position or with the inward detents 322 in the fully engaged position in accordance with a user's selection. Importantly, when in the fully engaged position, crenellation ring 356 couples with crenelated end 302 to further secure the accessory in a particular rotational position. As such, the combination of the inward detents and the crenellation adds additional structural support to embodiments disclosed herein.

It may be appreciated that the foregoing embodiments are provided as example configurations of accessory connectors and should not be construed as limiting as other combinations are readily discerned by one skilled in the art. For examples, detent embodiments may be positioned in either inward positions, outward positions, or both. Likewise, annular groove embodiments may be positioned in either inward positions, outward positions, or both. Still further detent and annular groove embodiments may be configured in combination or separately without limitation.

Figure 4:
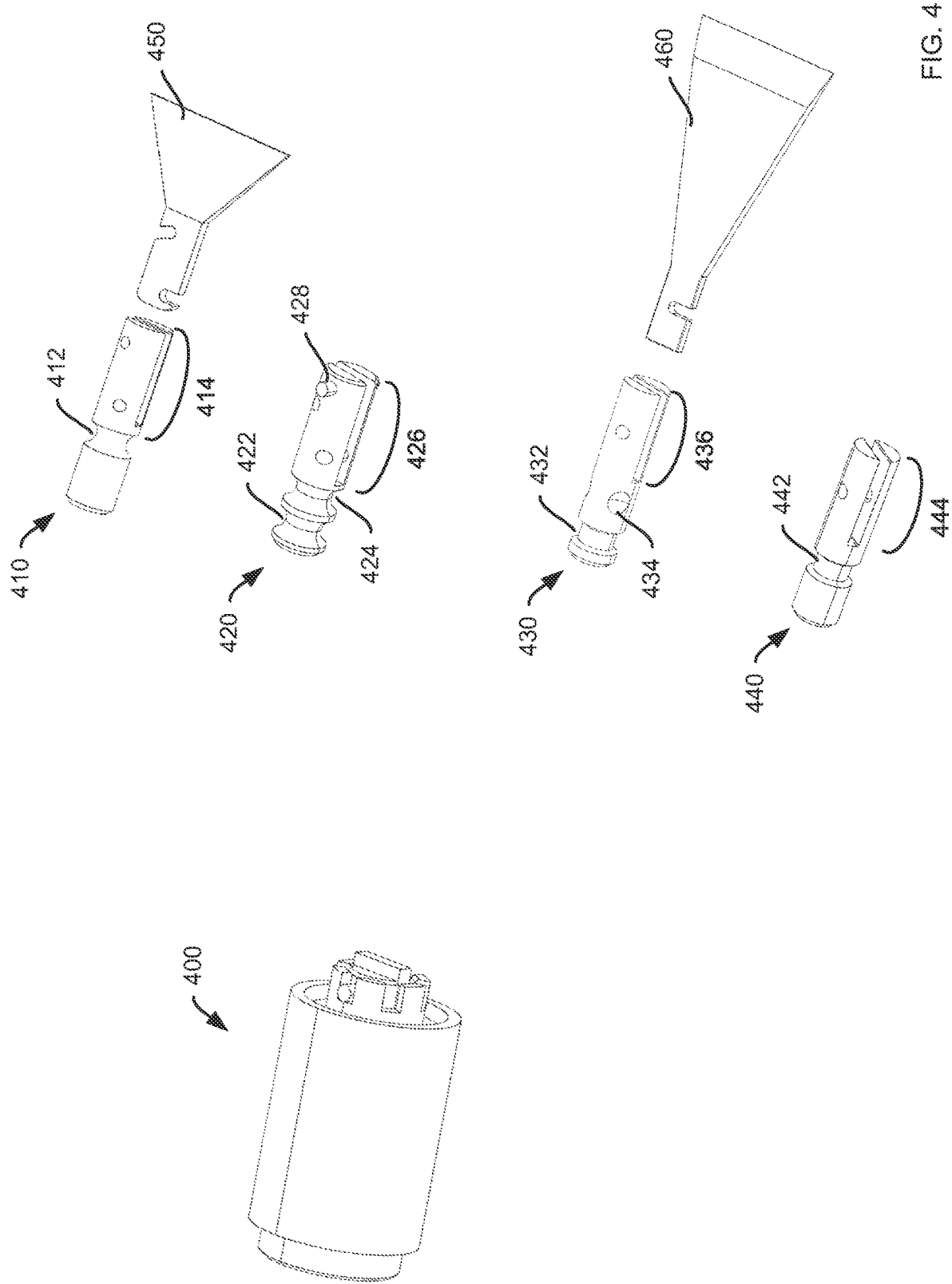
FIG. 4 is an illustrative representation of a tool adapter assembly with various accessory connectors and accessories in accordance with embodiments of the present invention.

FIG. 4 is an illustrative representation of a tool adapter assembly 400 with various accessory connectors and accessories in accordance with embodiments of the present invention. As may be appreciated, embodiments disclosed contemplate the use of a variety of accessory connectors and configurations suitable for use with quick release coupler embodiments. As illustrated, accessory connector 410 includes a single inward annular groove 412 configured to fully engage a quick release coupler embodiment. Accessory engagement portion 414 is a double pinned slotted embodiment suitable for receiving accessory 450. Further illustrated, accessory connector 420 includes outward annular groove 422 and inward annular groove 424 configured to either partially engage or fully engage a quick release coupler embodiment. Accessory engagement portion 426 is a double pinned slotted embodiment suitable for receiving accessory 450. In addition, crenellation stop 428 is configured to engage a crenelated end portion of a quick release coupler embodiment when fully engaged. Further illustrated, accessory connector 430 includes outward annular groove 432 configured to partially engage a quick release coupler embodiment and inward detents 434 to fully engage a quick release coupler embodiment. Accessory engagement portion 436 is a single pinned slotted embodiment suitable for receiving accessory 460. Still further illustrated, accessory connector 440 includes a single inward annular groove 442 configured to fully engage a quick release coupler embodiment. Accessory engagement portion 444 is a single pinned slotted embodiment suitable for receiving accessory 460. In slotted accessory engagement portion embodiments, the accessory is secured by a) the pins (whether single or double) and b) the partial cavity of the spindle that captures the accessory end.

Figure 5:
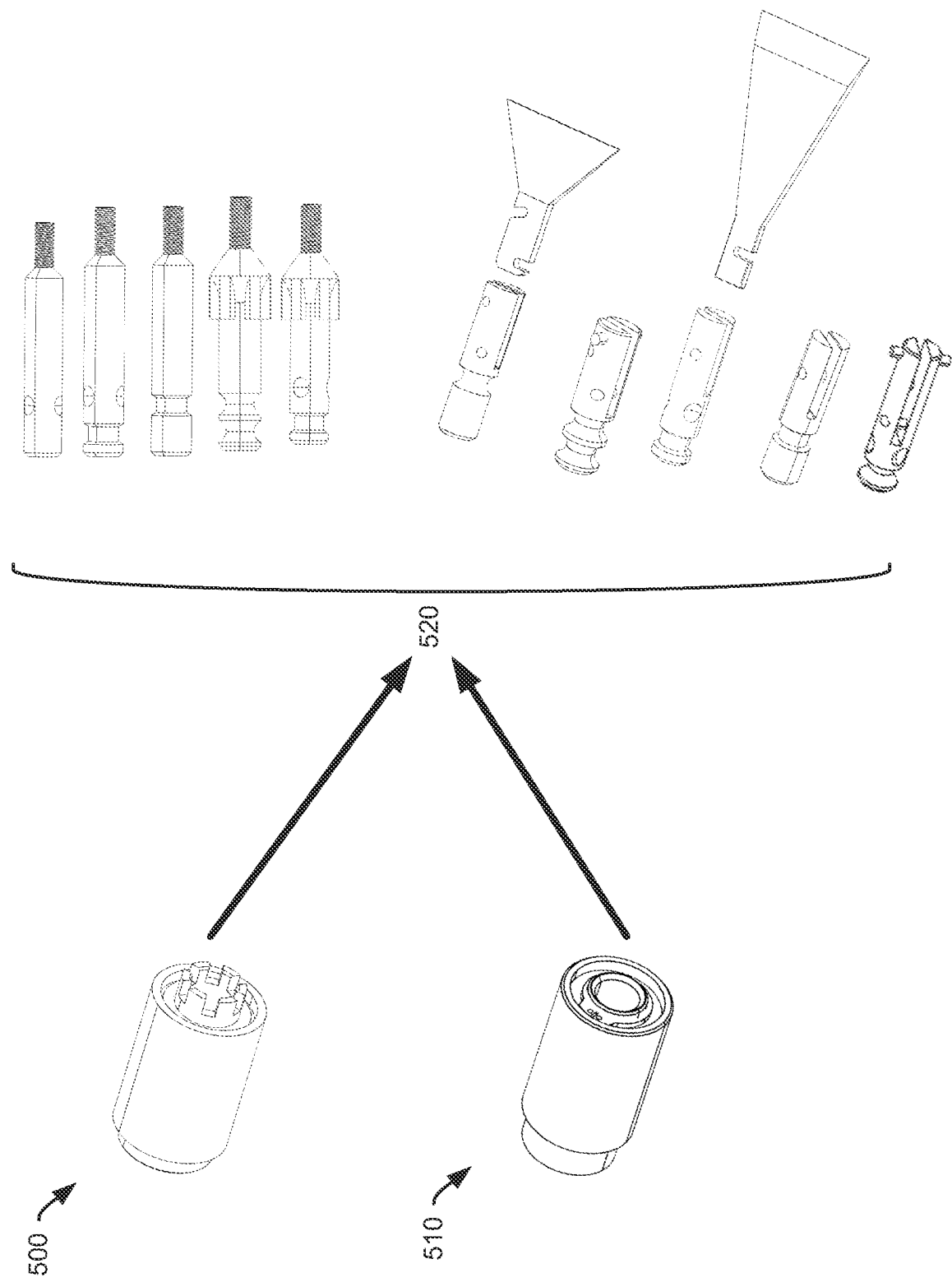
FIG. 5 is an illustrative representation of tool adapter assemblies with various accessory connectors in accordance with embodiments of the present invention.

FIG. 5 is an illustrative representation of tool adapter assemblies with various accessory connectors in accordance with embodiments of the present invention. FIG. 5 is provided to demonstrate the flexible configurations of embodiments disclosed herein. As such, a crenellated quick release coupler 500 and a non-crenellated quick release coupler 510 are configured to receive a variety of accessory connectors 520 in any combination without limitation. Quick release coupler embodiments are disclosed in further detail above for FIGS. 1 and 2. Accessory connector embodiments are disclosed in further detail for FIGS. 3-4 and 6. In embodiments, accessory engagement portions include a threaded end, a slotted end, a slotted and single pinned end, and a slotted and double pinned end without limitation.

Figure 6:
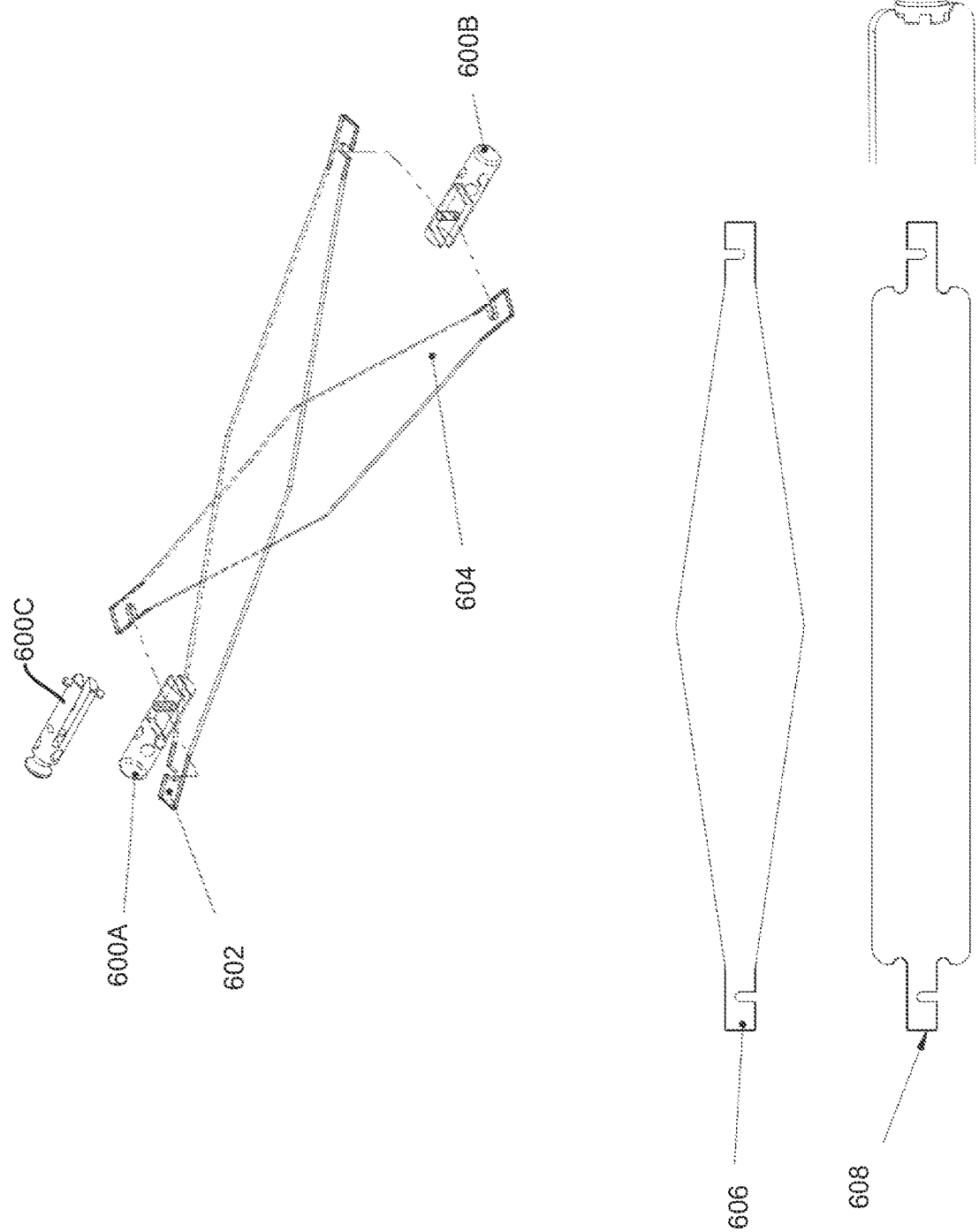
FIG. 6 is an illustrative representation of double accessory connectors in accordance with embodiments of the present invention.

FIG. 6 is an illustrative representation of double accessory connectors 600A and 600B in accordance with embodiments of the present invention. It may be desirable to utilize accessories that are secured along opposite ends of the accessory. As illustrated, accessory connector 600A may be coupled with accessory 604 along accessory tang 602. In operation, accessory connector 600A may be coupled with a power or manual tool and accessory connector 600B may be coupled with a handle capable of further stabilizing accessory 604. For example, when sanding, the additional accessory connector coupled with a handle may provide additional pressure or support to a sanding surface. As noted above, crenellated embodiments may provide even further support for tool adapters disclosed herein. For example, accessory connector 600C utilizes a pin to couple with a crenellated quick release coupler such as illustrated for FIG. 2 above. Double ended accessories may include a variety of shapes and/or profiles such as diamond shaped accessory 606 and rectangular shaped accessory 608. As illustrated, rectangular shaped accessory 608 further includes accessory connector 610, which is crenelated. In this example, the crenellations mate with intents formed on the accessory as shown. These examples are provided for clarity in understanding embodiments disclosed herein and should not be construed as limiting. Indeed, any variety of shapes and/or profiles may be utilized as recognized by one skilled in the art without departing from embodiments.

Figure 7:
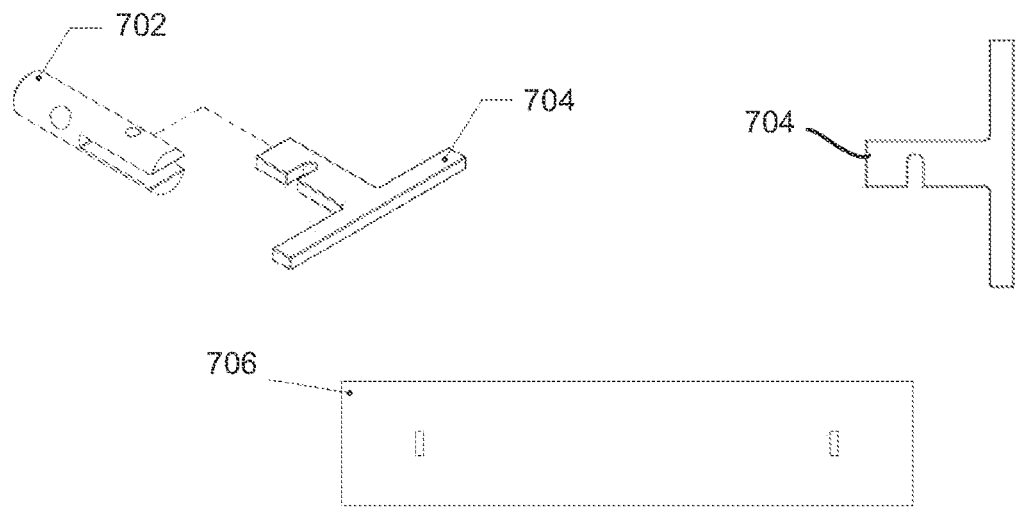
FIG. 7 is an illustrative representation of an accessory in accordance with embodiments of the present invention.

FIG. 7 is an illustrative representation of accessory 704 in accordance with embodiments of the present invention. In particular, accessory 704 may couple with accessory connector 702 which is a pinned and slotted embodiment. In the illustrative representation, accessory 704 may be further coupled with plate 706 which may be a flexible metallic plate, a rigid metallic plate, a flexible polymeric plate, a rigid polymeric plate, a belt, a sanding sheet, etc. Because of the stability with which accessory connectors are secured in embodiments provided herein, a variety of accessories and accessory attachments may be utilized safely and effectively.

Figure 8A:
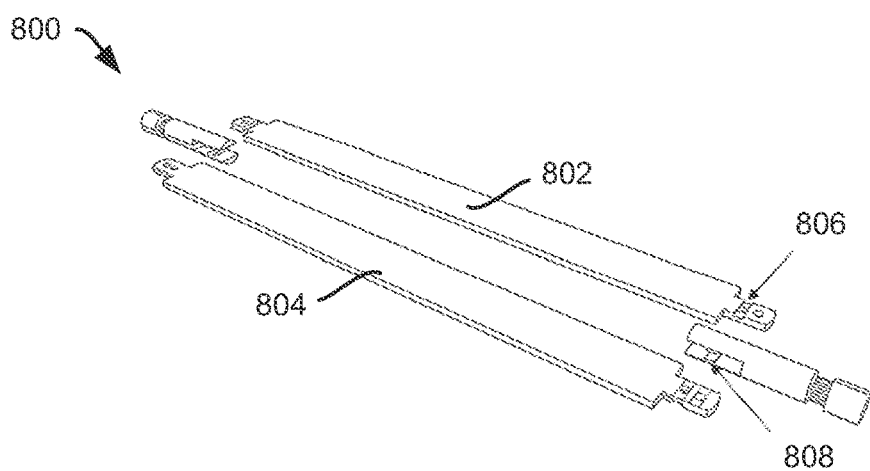
FIGS. 8A-8C are illustrative representations of a double accessory connector in accordance with embodiments of the present invention.
Figure 8B:
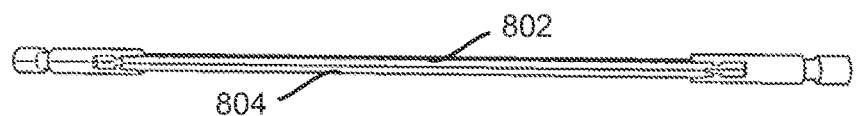
Figure 8C:
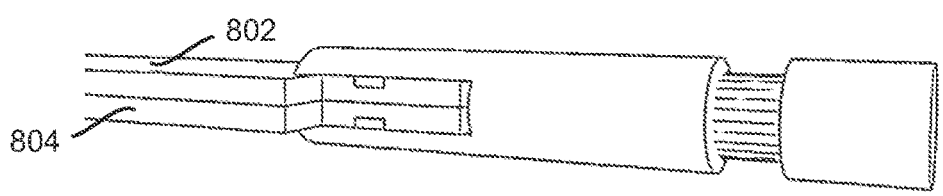

FIGS. 8A-8C are illustrative representations of double accessory connector assembly 800 in accordance with embodiments of the present invention. In particular, FIG. 8A illustrates an exploded view of double accessory connector assembly 800; FIG. 8B illustrates a side view of double accessory connector assembly 800; and FIG. 8C illustrates a partial side view of the double accessory connector assembly 800. As illustrated, accessory connector 808 is slotted and pinned. The slot is sufficiently sized to receive accessories 802 and 804 along accessory end 806. Accessories illustrated may each be a flexible metallic plate, a rigid metallic plate, a flexible polymeric plate, a rigid polymeric plate, a belt, a sanding sheet, etc. in any combination. Because of the stability with which accessory connectors are secured in embodiments provided herein, a variety of accessories and accessory attachments may be utilized safely and effectively.

Figure 9:
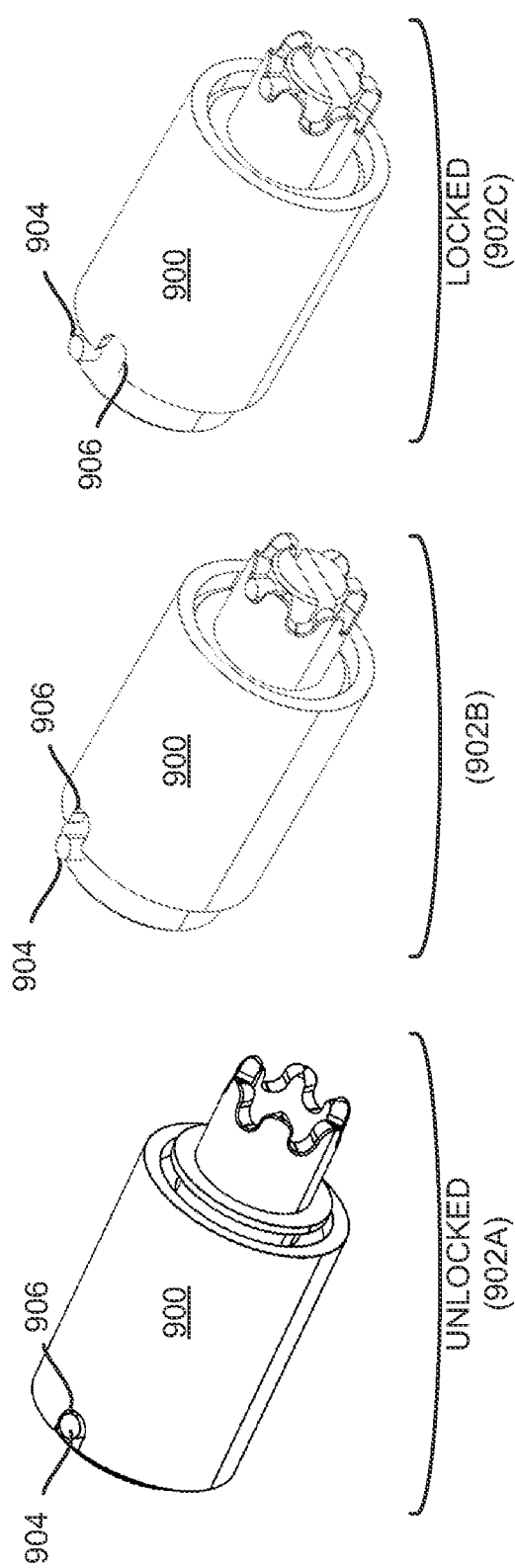
FIG. 9 is an illustrative representation of a tool adapter assembly with sleeve lock in accordance with embodiments of the present invention.

FIG. 9 is an illustrative representation of a tool adapter assembly 900 with sleeve lock in accordance with embodiments of the present invention. It may be appreciated that some uses of the embodiments disclosed herein require additional security. This may be particularly true when using high energy tool/accessory combinations. In some cases, the safety of the operator may be jeopardized using those combinations. In addition, when working in confined spaces, bumping a non-sleeve lock quick release connector may cause an accessory to eject suddenly. As such, sleeve lock embodiments provide additional safety and security in embodiments. To provide additional security, sleeve lock embodiments may be utilized. As illustrated, to unlock the sleeve, sleeve pin 904 is utilized in combination with sleeve slot 906. Thus, when sleeve pin 904 is captured by sleeve slot 906, the tool adapter assembly 900 is in unlocked 902A position. When sleeve pin 904 is not captured by sleeve slot 906, the tool adapter assembly 900 is in locked 902C position as moved from intermediate position 902B.

Figure 10:
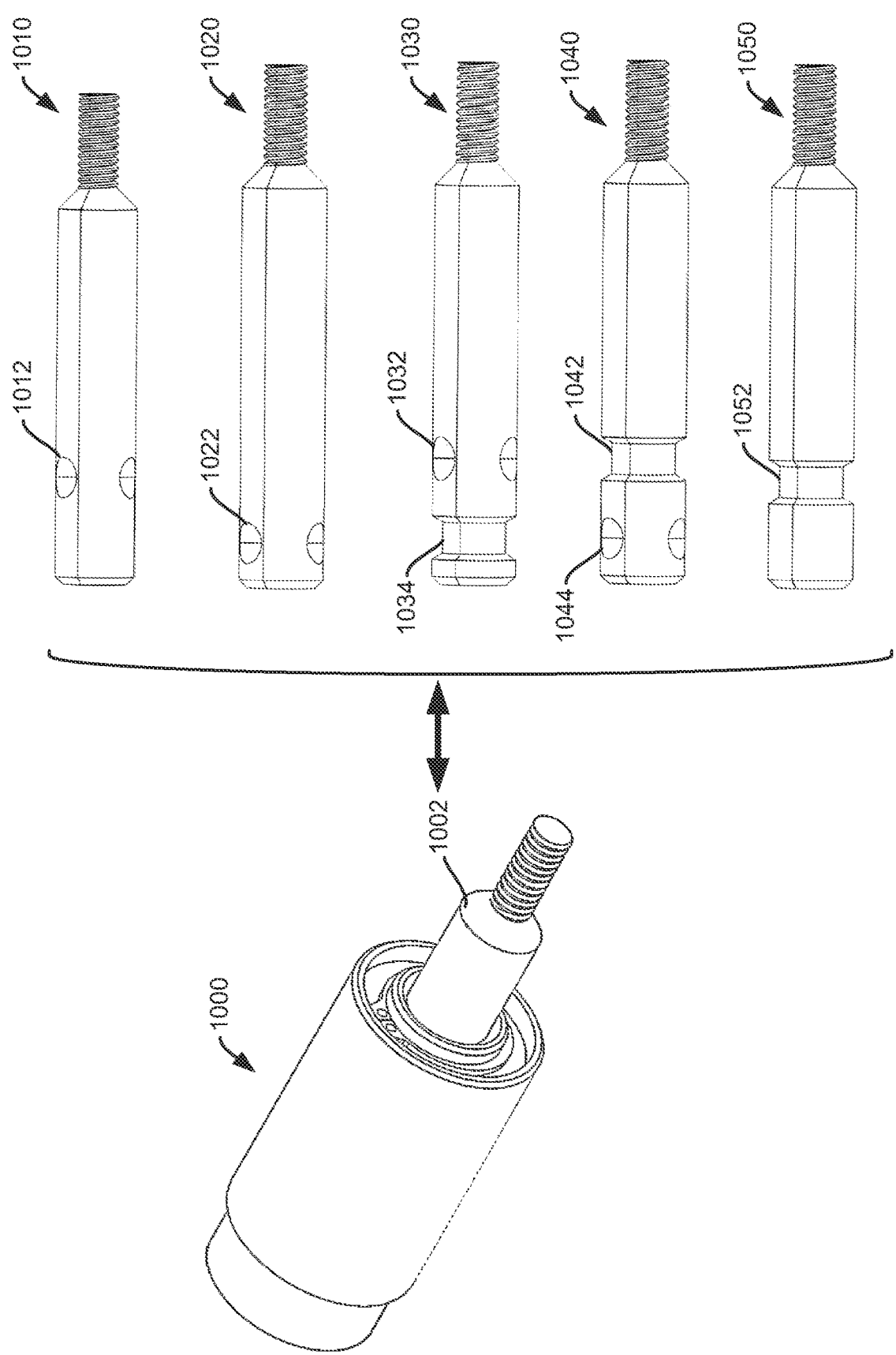
FIG. 10 is an illustrative representation of a tool adapter assembly with various accessory connectors in accordance with embodiments of the present invention.

FIG. 10 is an illustrative representation of a tool adapter assembly with various accessory connectors in accordance with embodiments of the present invention. As illustrated, quick release coupler 1000 includes an accessory connector 1002. As contemplated herein, various accessories connectors may be utilized with quick release coupler embodiments without a crenellated end portion as disclosed in FIG. 1. Further noted, the various accessory connectors illustrated include threaded accessory engagement portions. However, other accessory engagement portions may be utilized in embodiments without limitation as disclosed above. As illustrated, accessory connector 1010 includes detents 1012 positioned equidistantly around and along the cylindrical surface and configured to engage with a plurality of ball stops housed in the quick release coupler 1000. In some embodiments, up to six detents may be utilized. When engaged, the detents serve to secure the accessory connector into a particular rotational position, which may be desirable when using, for example, a flat chisel accessory. As illustrated, accessory connector 1010 may be coupled with the quick release coupler 1000 along detents 1012.

Further illustrated, accessory connector 1020 includes detents 1022 positioned equidistantly around and along the cylindrical surface and configured to engage with a plurality of ball stops housed in the quick release coupler 1000. In some embodiments, up to six detents may be utilized. When engaged, the detents serve to secure the accessory connector into a particular rotational position, which may be desirable when using, for example, a flat chisel accessory. As illustrated, accessory connector 1020 may be coupled with the quick release coupler 1000 along detents 1022. As may be appreciated, the different locations of detents between accessory connectors 1010 and 1020 allow for cross-usage with embodiments such as illustrated in FIG. 2.

Further illustrated is accessory connector 1030 includes a number of detents 1032 positioned equidistantly around and along the cylindrical surface and an annular groove 1034 positioned along the cylindrical surface each configured to separately engage with a plurality of ball stops housed in the quick release coupler 1000. When engaged, the annular groove serves to secure the accessory connector into a freely rotating position, which may be desirable when using, for example, a sanding accessory. Additionally, when engaged, the detents serve to secure the accessory connector into a desired fixed position, which may be desirable when using, for example, a flat chisel accessory. As illustrated, accessory connector 1030 may couple with the quick release coupler 1000 along the annular groove 1034 in a first engaged position or with detents 1032 in a second engaged position in accordance with a user's selection. When engaged in the fully engaged position, accessory connectors contact the accessory connector stop (see 114; FIG. 1B). Contact with the accessory stop connector in embodiments limits engagement of the accessory connector and mitigates shearing stresses on ball stops.

Further illustrated is accessory connector 1040 includes annular groove 1042 positioned along the cylindrical surface and detents 1044 positioned equidistantly around and along the cylindrical surface each configured to engage with a plurality of ball stops housed in the quick release coupler 1000. When engaged, the annular groove serves to secure the accessory connector into a freely rotating position, which may be desirable when using, for example, a sanding accessory. Additionally, when engaged, the detents serve to secure the accessory connector into a desired fixed position, which may be desirable when using, for example, a flat chisel accessory. As illustrated, accessory connector 1040 may couple with the quick release coupler 1000 along detents 1042 in a first engaged position or along the annular groove 1042 in a second engaged position in accordance with a user's selection. When engaged in the fully engaged position, accessory connectors contact the accessory connector stop (see 114; FIG. 1B). Contact with the accessory stop connector in embodiments limits engagement of the accessory connector and mitigates shearing stresses on ball stops.

Further illustrated is accessory connector 1050 that includes annular groove 1052 positioned along the cylindrical and configured to engage with a plurality of ball stops housed in the quick release coupler 1000. When engaged, the annular groove serves to secure the accessory connector into a freely rotating position, which may be desirable when using, for example, a sanding accessory. As illustrated, accessory connector 1050 may couple with the quick release coupler 1000. When engaged in the fully engaged position, accessory connectors contact the accessory connector stop (see 114; FIG. 1B). Contact with the accessory stop connector in embodiments limits engagement of the accessory connector and mitigates shearing stresses on ball stops.

It may be appreciated that the foregoing embodiments are provided as example configurations of accessory connectors and should not be construed as limiting as other combinations are readily discerned by one skilled in the art. For examples, detent embodiments may be positioned in either inward positions, outward positions, or both. Likewise, annular groove embodiments may be positioned in either inward positions, outward positions, or both. Still further detent and annular groove embodiments may be configured in combination or separately without limitation.

Methods of Use

In embodiments, methods for using tool systems disclosed herein include at least the steps of:

a) Providing a tool. Methods may utilize a variety of tools including a powered reciprocating tool, a powered oscillating tool, a powered rotating tool, a manual reciprocating tool, a manual oscillating tool, and a manual rotating tool without limitation.

b) Providing a tool adapter assembly embodiment as disclosed herein.

c) Providing an accessory. As contemplated herein, a variety of accessories may be utilized without limitation. Accessories may take advantage of the mechanical movement provided by the tool.

d) Coupling the tool with the tool adapter. In general, the tool will couple with the tool receiving hub. Coupling the tool with the tool receiving hub may be accomplished in a variety of manners known in the art without departing from embodiments provided herein. For example, the tool may be bolted to the tool hub, may be attached via a shank to the tool hub, may be threaded to the tool hub, etc. The manner of attachment may proceed as required to support the tool adapter and accessory movement and use.

e) Coupling the accessory with the accessory connector along the accessory engagement portion. As noted above, accessory engagement portion embodiments may include any of: a threaded end, a slotted end, a slotted and single pinned end, and a slotted and double pinned end.

f) Engaging the accessory connector with the quick release coupler along a first position corresponding with the one or more annular grooves, the detents, or both the annular groove and the detents.

In some embodiments, methods further include the step of:

g) Engaging the accessory connector with the quick release coupler along a second position corresponding with the one or more annular grooves, the detents, or both the annular groove and the detents.

In still other embodiments, methods further include the step of:

h) Engaging crenellations corresponding with the second position, where the spindle includes a crenelated end portion, and the accessory connector includes a crenelated ring positioned between the coupler engagement portion and the accessory engagement portion to engage the crenelated end portion in the second position.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A tool adapter assembly comprising:
   a quick release coupler comprising:
      a spindle defining a partial cylindrical cavity, the spindle including a base portion, the base portion defining a first cylindrical surface having a first diameter, wherein
         the base portion continues to a body portion, the body portion defining a second cylindrical surface having a second diameter, wherein
         the body portion continues to an end portion, the end portion defining a third cylindrical surface having a third diameter, wherein
         the base portion is configured to mechanically couple with a tool along a distal end of the base portion, and wherein
         the body portion includes a plurality of ball stop recesses equidistantly positioned along the second cylindrical surface and extending to the partial cylindrical cavity;
      a plurality of ball stops slidingly engaged with the plurality of ball stop recesses; and
      a sleeve slidingly coupled with the spindle, wherein the sleeve is configured to lock and release the plurality of ball stops; and
   an accessory connector defining a fourth cylindrical surface, the accessory connector comprising:
      a coupler engagement portion positioned along a distal end of the accessory connector, the coupler engagement portion comprising:
         a first plurality of detents positioned equidistantly along a circumference of the fourth cylindrical surface, wherein the first plurality of detents is proximately located with a single annular groove along the circumference of the fourth cylindrical surface, wherein the first plurality of detents and the single annular groove are configured to separately engage with the plurality of ball stops; and
      an accessory engagement portion positioned along a proximal end of the accessory connector.

2. The tool adapter assembly of claim 1, wherein the base portion further comprises:
   an accessory connector stop positioned along the base portion that limits engagement of the accessory connector at the distal end of the accessory connector; and
   a tool receiving hub including:
      a spindle face positioned along the distal end of the base portion; and
      a receiving bore extending from the spindle face along an axis of the base portion, wherein the spindle face and the receiving bore are each configurable to mechanically couple with the tool.

3. The tool adapter assembly of claim 1, wherein the accessory engagement portion is selected from the group consisting of: a threaded end, a slotted end, a slotted and single pinned end, and a slotted and double pinned end.

4. The tool adapter assembly of claim 1, wherein the tool is selected from the group consisting of: a powered reciprocating tool, a powered oscillating tool, a powered rotating tool, a manual reciprocating tool, a manual oscillating tool, and a manual rotating tool.

5. The tool adapter assembly of claim 1, wherein the coupler engagement portion engages the plurality of ball stops in a first position or in a second position corresponding with one of the singular annular groove, or the plurality of detents.

6. A tool system comprising:
   a tool, wherein the tool is selected from the group consisting of: a powered reciprocating tool, a powered oscillating tool, a powered rotating tool, a manual reciprocating tool, a manual oscillating tool, and a manual rotating tool;
   a tool adapter assembly mechanically coupled with the tool, the tool adapter assembly comprising:
      a quick release coupler comprising:
         a spindle defining a partial cylindrical cavity, the spindle including a base portion, the base portion defining a first cylindrical surface having a first diameter, wherein
            the base portion continues to a body portion, the body portion defining a second cylindrical surface having a second diameter, wherein
            the body portion continues to an end portion, the end portion defining a third cylindrical surface having a third diameter, wherein
            the base portion is configured to mechanically couple with the tool along a distal end of the base portion, and wherein
            the body portion includes a plurality of ball stop recesses equidistantly positioned along the second cylindrical surface and extending to the partial cylindrical cavity;
         a plurality of ball stops slidingly engaged with the plurality of ball stop recesses; and
         a sleeve slidingly coupled with the spindle, wherein the sleeve is configured to lock and release the plurality of ball stops; and
      an accessory connector defining a fourth cylindrical surface, the accessory connector comprising:
         a coupler engagement portion positioned along a distal end of the accessory connector, the coupler engagement portion comprising:
            a first plurality of detents positioned equidistantly along a circumference of the fourth cylindrical surface, wherein the first plurality of detents is proximately located with a single annular groove along the circumference of the fourth cylindrical surface, wherein the first plurality of detents and the single annular groove are configured to separately engage with the plurality of ball stops; and
         an accessory engagement portion positioned along a proximal end of the accessory connector.

7. The tool system of claim 6, wherein the base portion further comprises:
   an accessory connector stop positioned along the base portion that limits engagement of the accessory connector at the distal end of the accessory connector; and
   a tool receiving hub including:
      a spindle face positioned along the distal end of the base portion; and
      a receiving bore extending from the spindle face along an axis of the base portion, wherein the spindle face and the receiving bore are each configurable to mechanically couple with the tool.

8. The tool system of claim 6, wherein the accessory engagement portion is selected from the group consisting of: a threaded end, a slotted end, a slotted and single pinned end, and a slotted and double pinned end.

9. The tool system of claim 6, wherein the coupler engagement portion engages the plurality of ball stops in a first position and in a second position corresponding with one of the singular annular groove, or the plurality of detents.

10. Method of using a tool system comprising:
providing a tool, wherein the tool is selected from the group consisting of: a powered reciprocating tool, a powered oscillating tool, a powered rotating tool, a manual reciprocating tool, a manual oscillating tool, and a manual rotating tool;
providing a tool adapter assembly comprising:
 a quick release coupler comprising:
  a spindle defining a partial cylindrical cavity, the spindle including a base portion, the base portion defining a first cylindrical surface having a first diameter, wherein
  the base portion continues to a body portion, the body portion defining a second cylindrical surface having a second diameter, wherein
  the body portion continues to an end portion, the end portion defining a third cylindrical surface having a third diameter, wherein
  the base portion is configured to mechanically couple with the tool along a distal end of the base portion, and wherein
  the body portion includes a plurality of ball stop recesses equidistantly positioned along the second cylindrical surface and extending to the partial cylindrical cavity;
  a plurality of ball stops slidingly engaged with the plurality of ball stop recesses; and
  a sleeve slidingly coupled with the spindle, wherein the sleeve is configured to lock and release the plurality of ball stops; and
 an accessory connector defining a fourth cylindrical surface, the accessory connector comprising:
  a coupler engagement portion positioned along a distal end of the accessory connector, the coupler engagement portion comprising: a first plurality of detents positioned equidistantly along a circumference of the fourth cylindrical surface, wherein the first plurality of detents is proximately located with a single annular groove along the circumference of the fourth cylindrical surface, wherein the first plurality of detents and the single annular groove are configured to separately engage with the plurality of ball stops; and
  an accessory engagement portion positioned along a proximal end of the accessory connector;
providing an accessory;
coupling the tool with the tool adapter assembly;
coupling the accessory with the accessory connector along the accessory engagement portion; and
engaging the accessory connector with the quick release coupler along a first position corresponding with one of the singular annular groove, or the plurality of detents.

11. The method of claim 10, further comprising:
engaging the accessory connector with the quick release coupler along a second position corresponding with one of the singular annular groove, or the plurality of detents.

\* \* \* \* \*